Dec. 4, 1945.   W. B. BURKE   2,390,420
DRILLING MACHINE
Filed Feb. 1, 1944   6 Sheets-Sheet 1
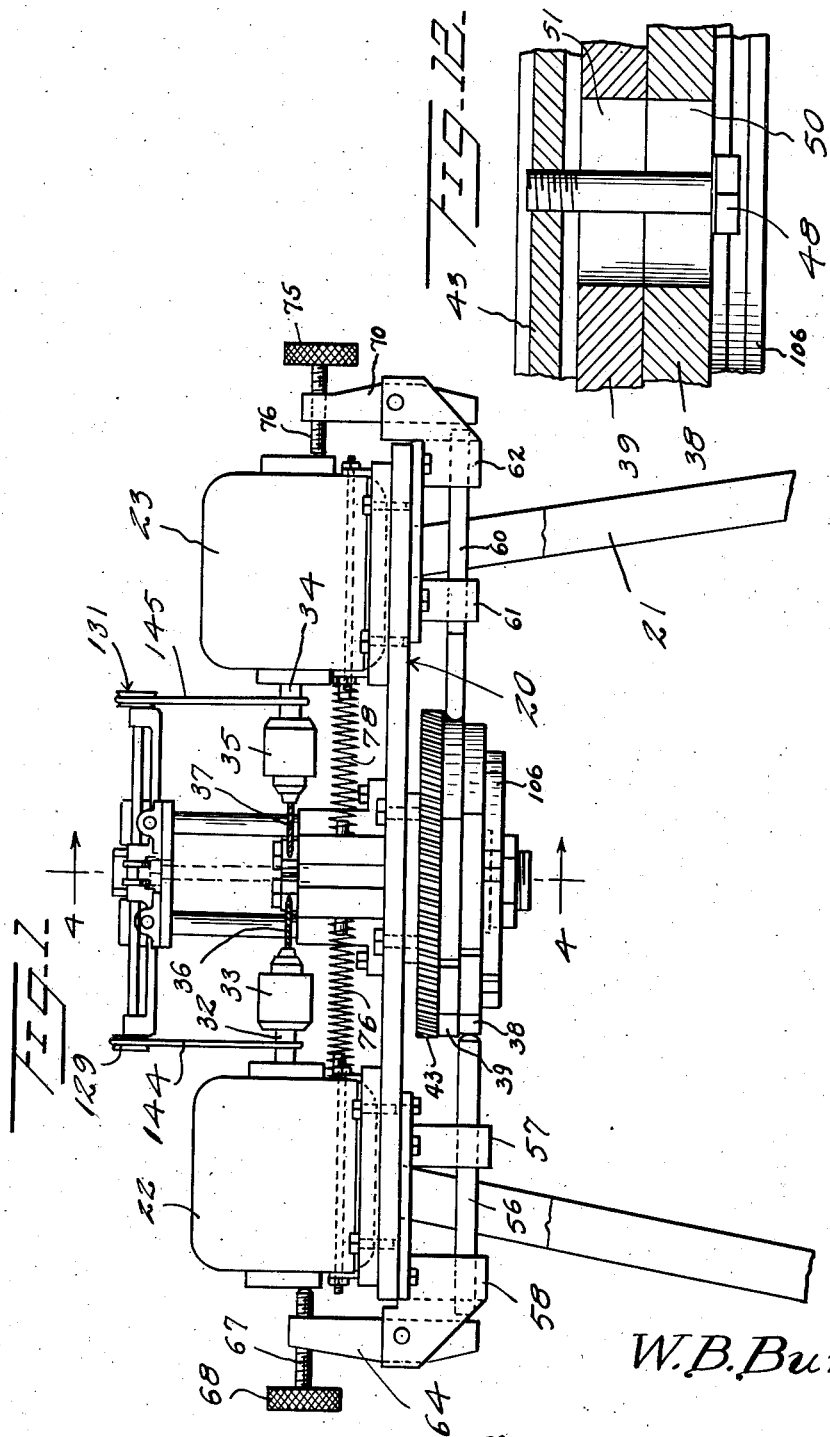
Inventor
W.B.Burke
By
Kimmel & Crowell
Attorneys Dec. 4, 1945.   W. B. BURKE   2,390,420
DRILLING MACHINE
Filed Feb. 1, 1944   6 Sheets-Sheet 2
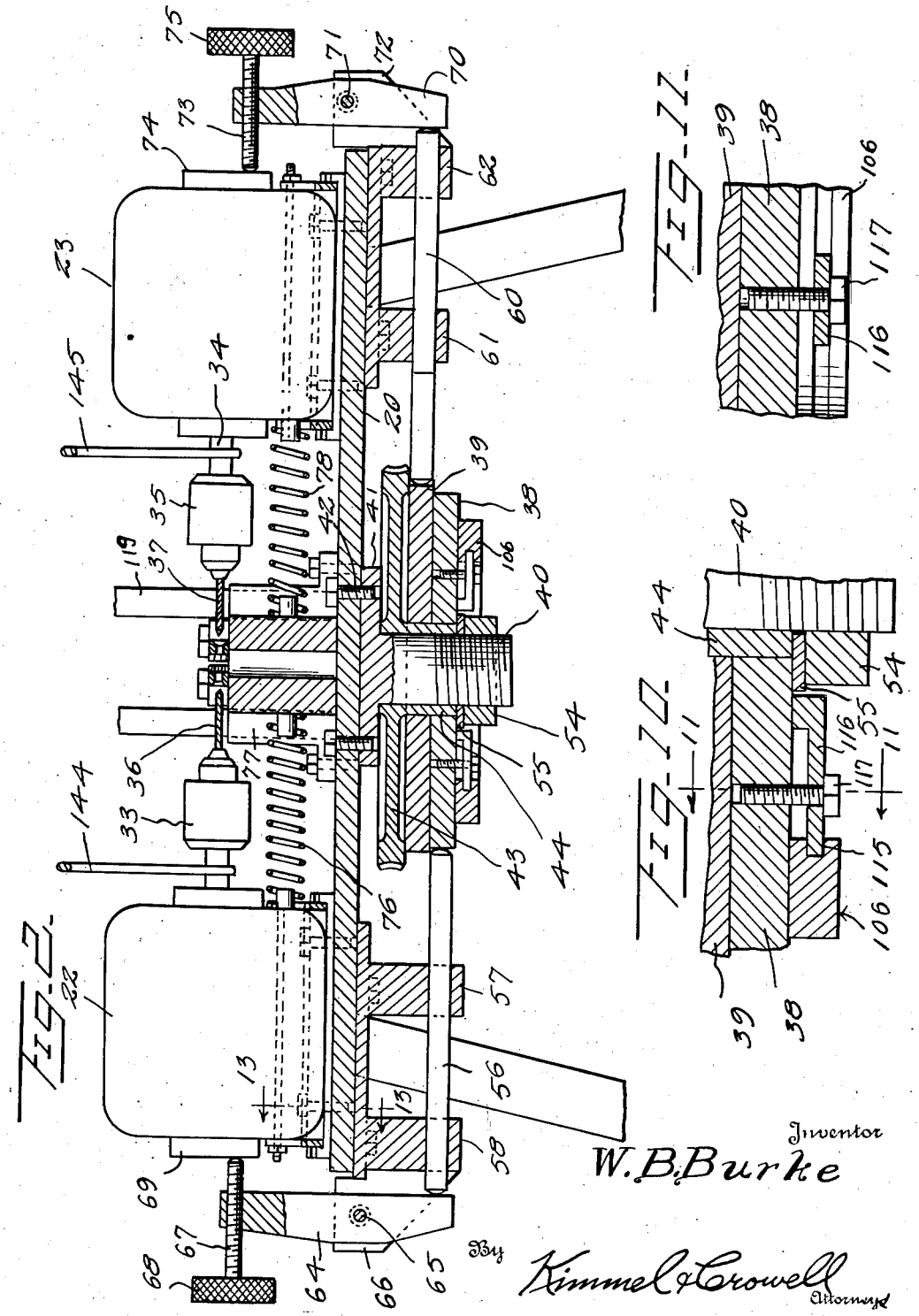
Inventor
W. B. Burke
By Kimmel & Crowell
Attorneys

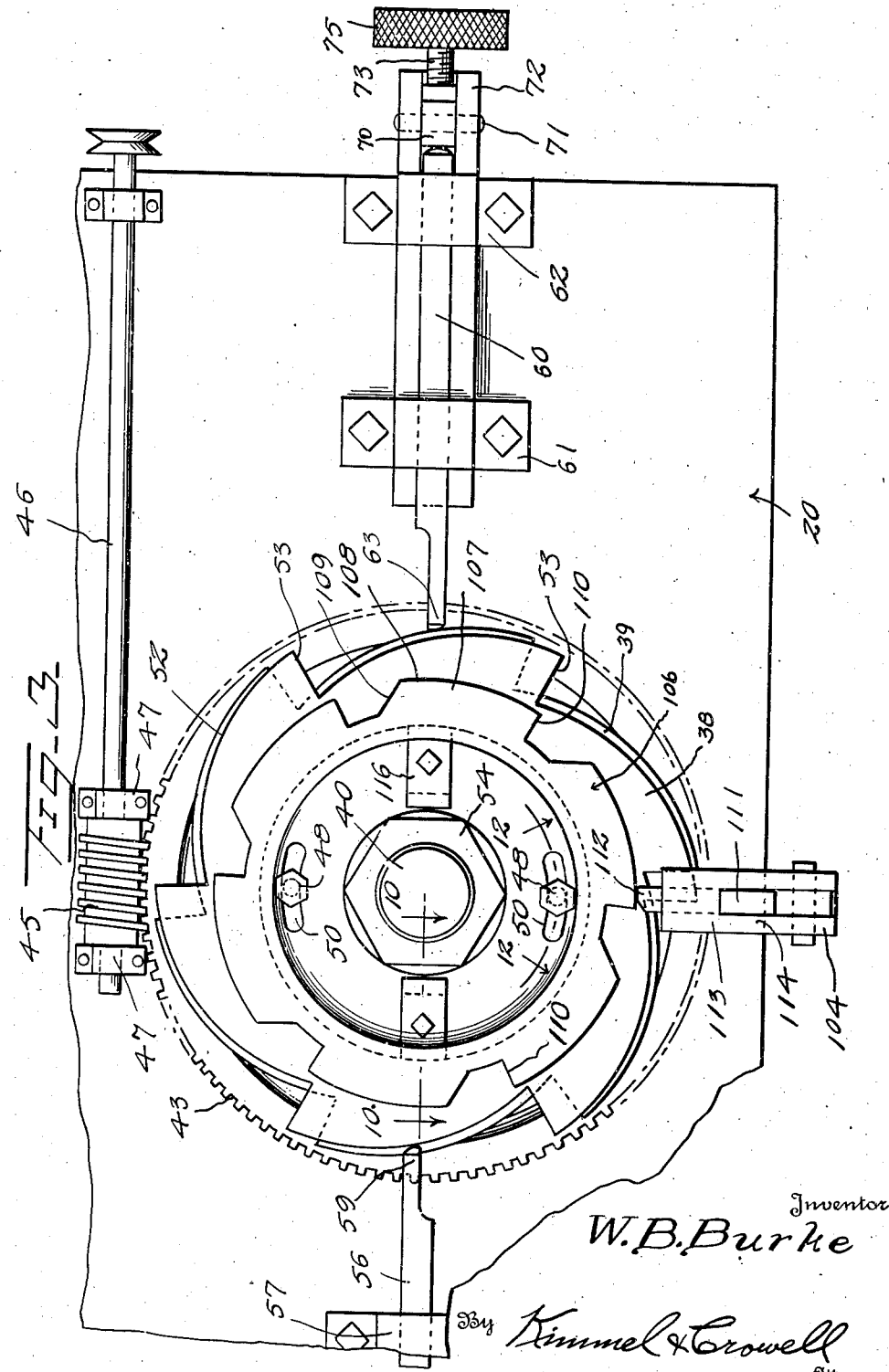

Dec. 4, 1945. W. B. BURKE 2,390,420
DRILLING MACHINE
Filed Feb. 1, 1944 6 Sheets-Sheet 4
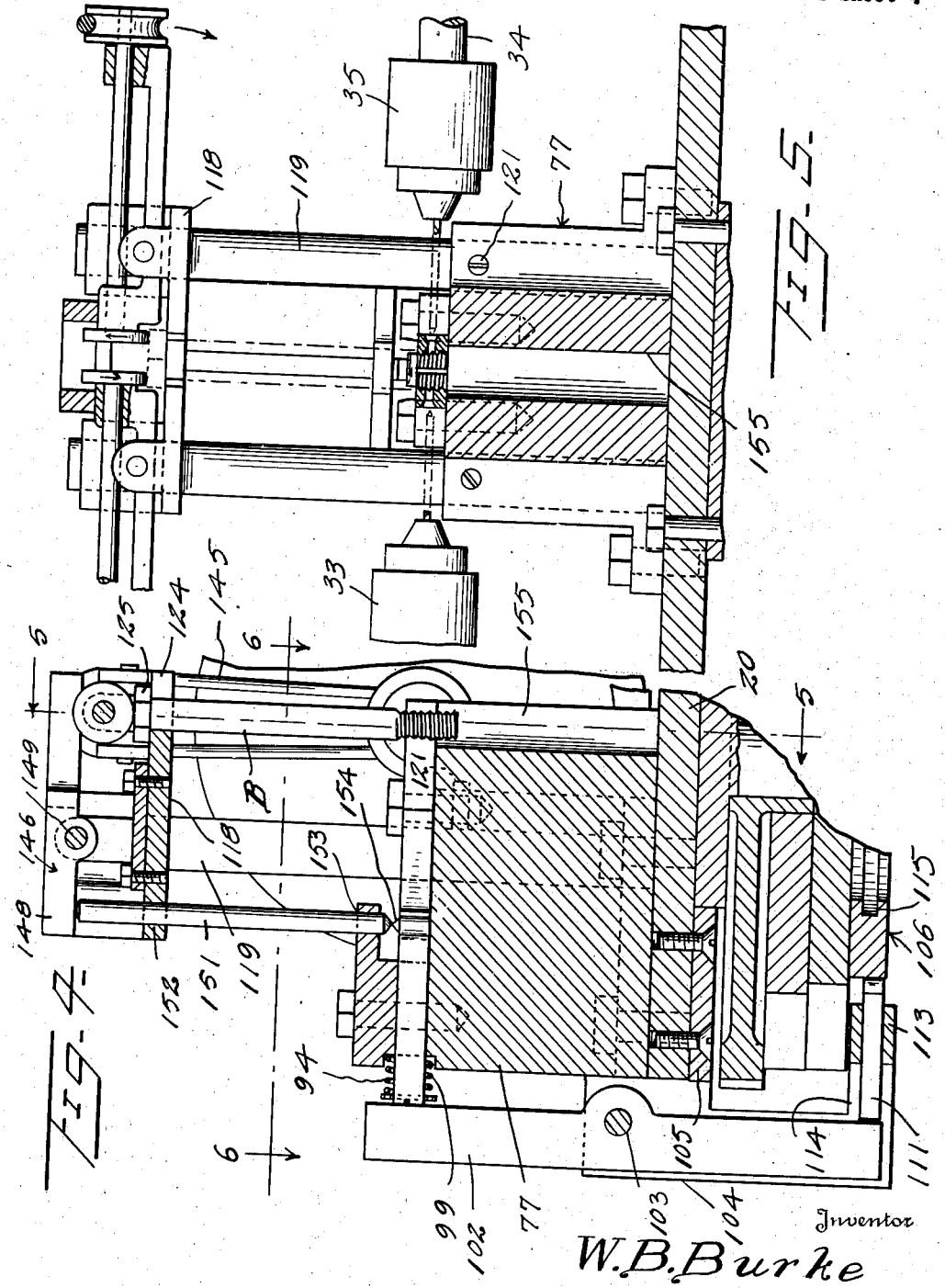
Inventor
W. B. Burke
By Kimmel & Crowell
Attorneys

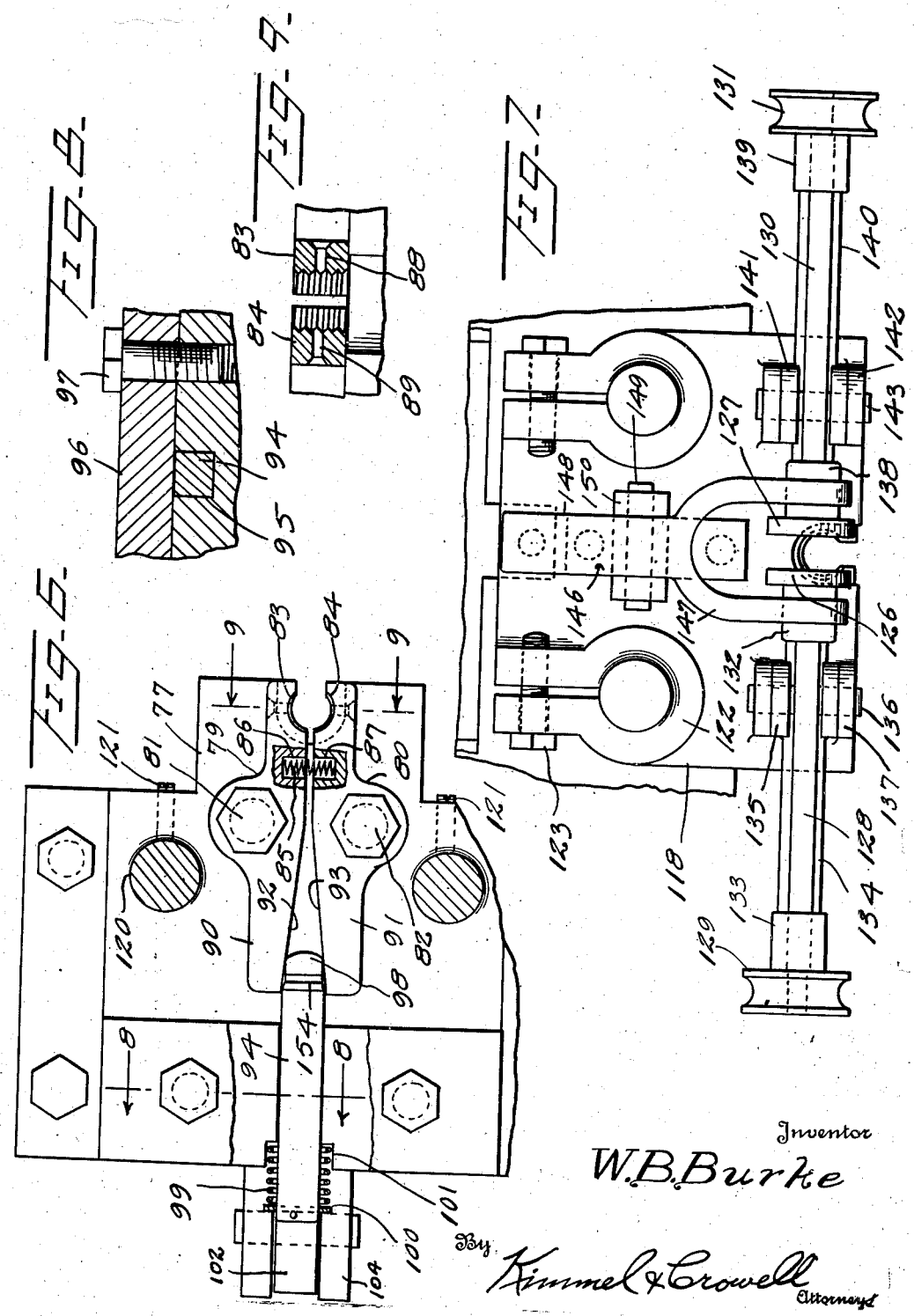

Dec. 4, 1945.  W. B. BURKE  2,390,420
DRILLING MACHINE
Filed Feb. 1, 1944  6 Sheets-Sheet 6
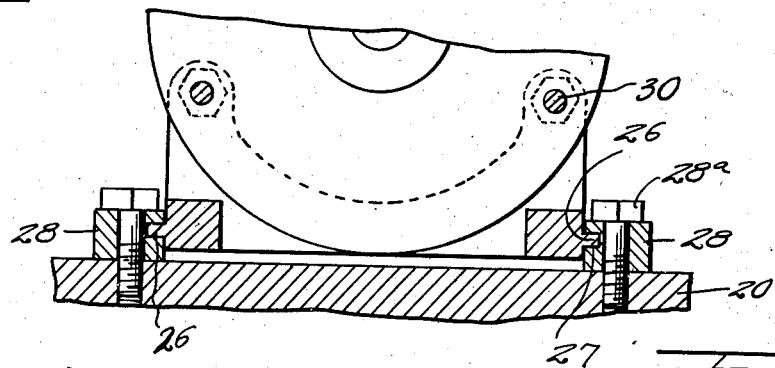
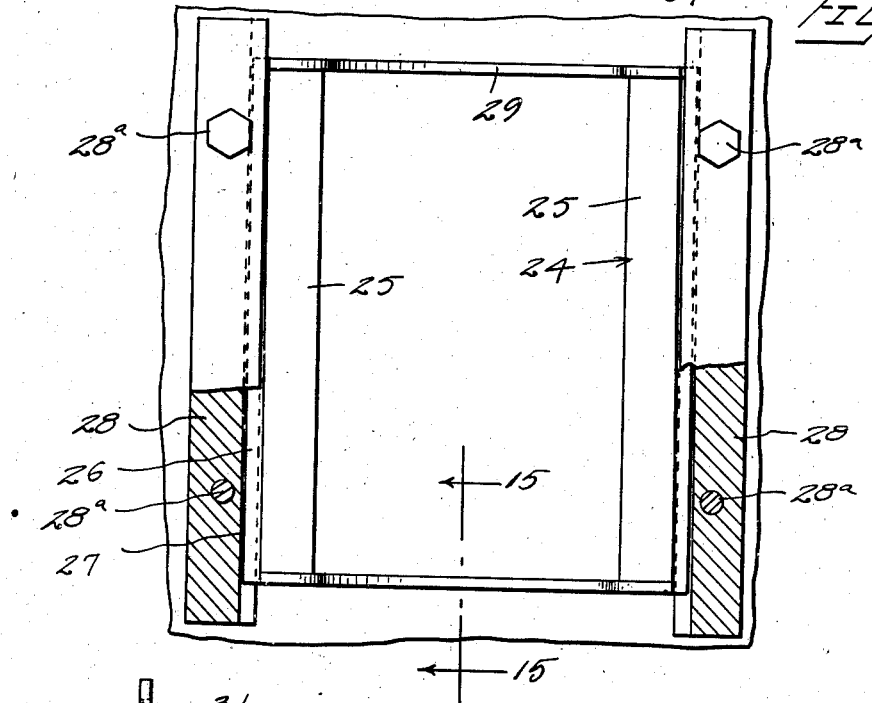
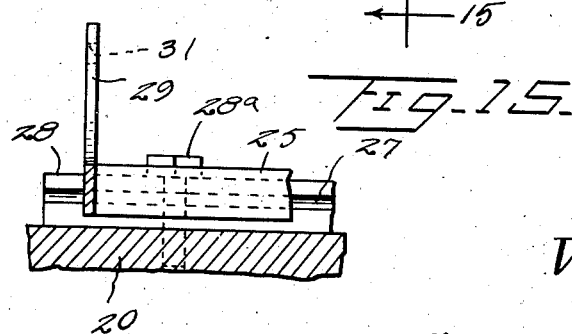
Inventor
W. B. Burke
By Kimmel & Crowell
Attorneys Patented Dec. 4, 1945

2,390,420

UNITED STATES PATENT OFFICE 2,390,420

DRILLING MACHINE

Wilbur B. Burke, Cleveland, Ohio

Application February 1, 1944, Serial No. 520,649

6 Claims. (Cl. 77—21)

This invention relates to drilling machines having opposed aligned spindles.

In the drilling of a bolt shank to provide a transverse hole adjacent the threaded end for receiving a cotter pin, or nut locking wire, it is difficult to form this transverse hole without creating a burr at one or both ends of the hole which prevents the smooth threading of the nut on the bolt, or threading of the bolt into a threaded socket. It is therefore an object of this invention to provide a drilling machine which is so constructed and arranged that a transverse hole can be quickly drilled through the bolt shank at a predetermined position and the opposite ends of the holes being entirely free from burrs.

Another object of this invention is to provide a machine of this kind which is automatic in its operation and will thereby speed up the drilling operation.

A further object of this invention is to provide in a machine of this kind an opposed pair of drill spindles and cam operated means for simultaneously moving the spindles toward each other, the cam means being so arranged that one spindle will lag behind the other spindle so that each drill may cross the center line of the bolt shank, the earlier operating drill retreating out of the drilled hole ahead of the later operating drill, and the latter drill partially reaming the inner portion of the hole formed by the earlier drill.

A further object of this invention is to provide in a machine of this kind an improved automatically operable bolt clamping means for holding the bolt during the drilling operation.

A further object of this invention is to provide in a machine of this kind an automatically operable bolt clamping means for holding the bolt during the drilling operation, and automatically operable means for tightening the bolt in the clamping means prior to the firm clamping of the bolt by said clamping means, the tightening operation being only momentarily operative.

With the foregoing objects and others which may hereinafter appear, the invention consists of the novel construction, combination and arrangement of parts as will be more specifically referred to and illustrated in the accompanying drawings, wherein are shown embodiments of the invention, but it is to be understood that changes, modifications and variations may be resorted to which fall within the scope of the invention as claimed.

In the drawings:

Figure 1 is a detail front elevation partly broken away of a drilling machine constructed according to an embodiment of this invention, Figure 2 is a fragmentary longitudinal section of the machine, Figure 3 is a fragmentary bottom plan of the machine, Figure 4 is a fragmentary sectional view taken on the line 4—4 of Figure 1, Figure 5 is a sectional view taken on the line 5—5 of Figure 4, Figure 6 is a fragmentary sectional view taken on the line 6—6 of Figure 4, Figure 7 is a fragmentary top plan of the rear portion of the machine, Figure 8 is a fragmentary sectional view taken on the line 8—8 of Figure 6, Figure 9 is a fragmentary sectional view taken on the line 9—9 of Figure 6, Figure 10 is a fragmentary sectional view taken on the line 10—10 of Figure 3, Figure 11 is a sectional view taken on line 11—11 of Figure 10, Figure 12 is a fragmentary sectional view taken on the line 12—12 of Figure 3, Figure 13 is a fragmentary sectional view taken on line 13—13 of Figure 2, Figure 14 is a plan view partly in section of the motor cradle, and Figure 15 is a sectional view taken on line 15—15 of Figure 14.

Referring to the drawings the numeral 20 designates generally a table or bed which is mounted on supporting legs 21. The table or bed 20 may be rectangular in plan and has mounted on the upper side thereof a pair of drill operating motors 22 and 23. The motors 22 and 23 are disposed in axial alignment and are movable endwise towards and from each other. The mounting means for each motor is identical and is shown more specifically in Figures 13, 14 and 15.

A cradle generally designated as 24 is secured to the motor 22 and comprises a pair of elongated bars 25 provided with an outwardly projecting tongue 26 which is engageable in a horizontally disposed guide 27 formed in a guide bar 28. There are two of these elongated bars 25 and two guide bars 28, the latter being secured to the upper side of the table by fastening members 28a. The slide bars 25 have secured to the opposite ends thereof arcuate bars 29 which engage at the opposite ends of the motor 22, and the motor bolts 30 are adapted to be extended through openings 31 provided in the upper ends of the arcuate bars 29 so that the motor 22 will be firmly secured within the cradle or slide member 24.

The motor 22 includes an armature shaft 32 having a drill chuck 33 mounted on the inner end thereof, and the motor 23 includes an armature shaft 34 having a drill chuck 35 mounted on the inner end thereof.

Referring now to Figures 1, 2, 3, 10 and 11, the motors 22 and 23 are adapted to be moved towards each other for drilling an article disposed between the drills 36 and 37 carried by the chucks 33 and 35, respectively, by means of a pair of rotating cams 38 and 39. A depending stationary shaft 40 having a head or plate 41 secured at the upper end thereof is secured beneath the bed 20 by fastening members 42. A worm gear 43 is rotatable on the shaft 40 and is provided with a cylindrical hub 44 on which the cam members 38 and 39 are firmly secured. A worm 45 which is mounted on a drive shaft 46 journalled in a bearing 47 secured beneath the table 20 meshes with the common gear 43 and is adapted to rotate this latter gear. The drive shaft 46 may be connected to a suitable power device, such as a motor or the like, which may be supported in any suitable manner with respect to the table 20.

The cam members 38 and 39 are of like construction, cam member 39 being uppermost and these members are secured, as shown in Figure 12, to the worm gear 43 by means of at least a pair of bolts or fastening members 48. The two cam members 38 and 39 may be formed with arcuate slots 50 and 51, respectively, through which the fastening members 48 are adapted to engage so that cam member 38 may be circumferentially adjusted with respect to cam member 39. The cam members are of like construction, as shown in Figure 3, and include an arcuate cam surface 52 which terminates in an abrupt radial surface 53.

There are a series of these arcuate cam surfaces 52 on each cam member so that the motor operating plungers or rods will be reciprocated a number of times for each complete rotation of the common gear 43 and the cams 38 and 39. The cam assembly including the two cams 38 and 39 and the cam gear 43 are held on the shaft 40 by means of a nut 54 which is threaded on the lower end of the shaft 40 and bears against the lower end of the hub 44.

Preferably, a thrust washer 55 is interposed between the upper end of the nut 54 and the lower end of the hub 44. A horizontally slidable plunger or elongated rod 56 is slidable in a pair of bearings 57 and 58 which are secured to the lower side of the table 20 adjacent one end thereof. The inner end of the rod or plunger 56 is provided with a cam engaging head 59, the rod 56 engaging the lower cam 38. A second horizontally slidable plunger or rod 60 is slidable in a pair of bearings 61 and 62 which are secured beneath the table 20 adjacent the end thereof opposite from the guides or bearings 57 and 58. The rod 60 at its inner end is formed with a cam engaging head 63 which is adapted to engage the arcuate cam lobes or elements formed on the periphery of the cam member 39.

A rock lever 64 is disposed at one end of the bed or table 20 being rockably mounted on a pivot member 65 which is carried by a pair of outwardly extending ears or arms 66 which may be formed integral with the outer guide or bearing 58. The lower end of the rock lever 64 engages against the outer end of the plunger or slide member 56 and the rock lever 64 at its upper end has threaded therethrough a motor adjusting member 67 having a hand wheel or knob 68 at its outer end. The inner end of the adjusting member 67 which is in the form of a screw bears against a plate 69 carried by the outer end of the motor 22.

The adjusting member 67 is provided so that the drill 36 of the chuck 33 may be adjusted endwise with respect to the drill 37. A second rock lever 70 is rockably mounted on a pivot 71 carried by a pair of outwardly extending ears or arms 72 which are carried by the outermost bearing or guide 62. An adjustable screw 73 is threaded through the upper portion of the rock lever 70 and bears against a plate 74 carried by the outer end of the motor 23. A knob or wheel 75 is carried by the outer end of the screw 73 so that the motor 23 and the drill 37 operated thereby may be adjusted endwise with respect to the drill 36 and the motor 22.

The two motors 22 and 23 are adapted to have substantially equal endwise movement towards and from each other but preferably, the movement of the motor 22 lags behind the movement of the motor 23 so that the two drills 36 and 37 may be moved inwardly past the center line of a bolt which is being drilled through by the drills as will be hereinafter described.

The proper timing of the movement of motor 22 with respect to motor 23 is attained by circumferentially adjusting cam 38 with respect to cam 39 so that the radial faces 53 of the cam lobes 52 will be positioned out of alignment with the radial faces of the cam lobes of the cam 39. Motor 22 is returned to its outermost inoperative position by means of a spring 76 which at its outer end bears against the inner end of the motor 22 and at its inner end bears against a stationary block 77 which is fixed to the upper side of the bed 20. Motor 23 is returned to its outermost inoperative position by means of a spring 78 which at its outer end bears against the motor 23 and at its inner end bears against the block 77 on the side of the block opposite from the spring 76.

The springs 76 and 78 also serve to maintain the lower ends of levers 64 and 70 in engagement with the outer ends of plungers 56 and 60, respectively, and also serve to maintain the inner ends of the plunger lever operating rods against the cam members 38 and 39.

The drills 36 and 37 are adapted to drill a diametrical hole through a threaded bolt and preferably through the threads of the bolt at a predetermined point adjacent the threaded end of the bolt as will be hereinafter described.

Referring now to Figures 6, 8 and 9, the block 77 has mounted on the upper side thereof a pair of bolt clamping members 79 and 80 which are rockably carried by pivot bolts 81 and 82 respectively. The bolt clamping lever 79 at its forward end is provided with a bolt clamping jaw 83 which is formed with fragmentary threads on the inner side thereof for receiving the threaded end of a bolt B. The lever or clamping member 80 is formed with a bolt clamping jaw 84 at its forward end which confronts the jaw 83, and the jaw 84 is also formed with fragmentary threads for engaging the threads of the bolt B. An expanding spring 85 which is mounted in opposed sockets 86 and 87 formed in the levers 79 and 80 constantly urges the jaws 83 and 84 apart to released position. A jaw member 83 is provided with a horizontal drill guide opening 88 and jaw member 84 is also provided with a drill guide opening 89. Drill 36 is adapted to engage in opening 89, whereas drill 37 is adapted to engage in opening 88.

The bolt clamping levers 79 and 80 are formed with rearwardly projecting arms 90 and 91, respectively, having forwardly convergent confronting faces 92 and 93, respectively. An operating plunger 94, which is as shown in Figure 8 polygonal in transverse section, is slidably mounted in a guide passage 95 provided in the rear portion of the block 77. A plate 96 is secured by fastening members 97 to the upper side of the block 77 and holds the plunger 94 in the guide passage 95. The forward end of the plunger 95 is formed with a lever spreading head 98 which is adapted to engage between the rearwardly divergent faces 92 and 93, so as to move the jaw members 83 and 84 towards each other and to bolt clamping position.

Spring 99 is disposed about the rear end portion of the plunger 94 bearing at its rear end against a collar or washer 100 fixed on the plunger 94, and the forward end of the spring 99 is seated in a recess 101 formed in the rear side of the block 77.

Referring now to Figure 4, the plunger 94 is adapted to be moved inwardly to operative position by means of a rock lever 102 which is mounted on a pivot 103. The pivot 103 is carried by a pair of ears 104 which are formed integral with a plate 105 secured to the underside of the bed 20. The lever 102 is rocked by means of a cam 106 which is secured to the lower side of the cam 38. The configuration of cam 106 is shown more clearly in Figure 3 and includes a plurality of circumferentially spaced apart cam lobes 107 having arcuate outer sides 108, a beveled leading end 109 and a radial trailing end 110.

A plunger 111 having a cam engaging head or inner end 112 is slidable in a guide or bearing 113. The guide or bearing 113 is supported by means of a pair of forwardly projecting arms 114 which may be formed integral with the lower ends of the arms or ears 104. The cam member 106 is of annular construction and is provided on the inner circle thereof with an annular groove 115. A pair of clamping bars 116 are adapted to clamp the cam member 106 in its proper position, the clamping bars 116 being of L-shape in transverse section, as shown more clearly in Figure 10. One leg of each clamping member 116 is adapted to bear against the lower side of the cam member 38, whereas the other leg of the clamping member 116 is horizontal and the outer terminal end thereof is seated in the annular groove 115. The clamping members 116 are secured to the lower cam 38 by fastening members 117 which are threaded into the cam 38.

The bolt B is supported in a vertical position whereby the lower threaded end thereof will be disposed between the jaws 83 and 84 by means of a bolt supporting plate or table 118. The plate 118 is supported above the block 77 by means of a pair of vertical supporting rods 119. The rods 119 at their lower ends engage in sockets 120 carried by the block 77 and are secured in adjusted position in the sockets 120 by means of set screws 121. The plate 118 has formed integral with the upper side thereof a pair of split bosses 122 through which the rods or supporting members 119 engage. Tightening bolts 123 engage through the split portions of the bosses 122 so as to tightly clamp the plate 118 with respect to the supporting rods 119. The plate 118 is formed in its forward edge with a recess or slot 124 within which the upper end of the bolt B is adapted to engage, the head 125 of the bolt resting on the upper side of the plate 118 and being larger than the width of the slot or recess 124.

In order to provide for partial rotation of the bolt B to tighten the latter between the jaws 83 and 84 and the plate 118, I have provided a pair of rollers or wheels 126 and 127. Wheel 126 is fixedly mounted on a shaft 128 which has a grooved pulley 129 on the end thereof opposite from the wheel 126. Wheel 127 which is spaced from wheel 126 is mounted on a shaft 130 having a grooved pulley 131 on the outer end thereof. Shaft 128 is journaled in a pair of bearings 132 and 133 which are carried by a rockable lever 134. The lever 134 is provided with a pair of upwardly projecting ears 135 disposed on opposite sides of the shaft 128 and pivot member 136 extends through a pair of stationary ears 137 carried by the plate 118, the pivot 136 also engaging through the ears 135 below the shaft 128.

Shaft 130 is journaled in a pair of bearings 138 and 139 which are carried by a rock lever 140. The rock lever 140 is formed with a pair of upwardly projecting ears 141 positioned between a pair of stationary ears 142 carried by the plate 118. A pivot member 143 extends through the ears 141 and 142 so as to pivotally support the lever 140 and the bearings 138 and 139 with respect to the plate 118. A flexible and elastic belt 144 engages pulley 129 and also engages about armature shaft 32. A second flexible and elastic belt 145 engages pulley 131 and also engages about armature shaft 34. Shafts 128 and 130 operate in reverse direction with respect to each other, but in the same direction as shafts 32 and 34.

Normally the bolt rotating wheels 126 and 127 are disposed in the disengaged position with respect to the head 125 of the bolt B, the elastic belts 144 and 145 swinging the levers 134 and 140 downwardly at their outer ends so as to raise the wheels 126 and 127 from the head 125 of the bolt. The wheels 126 and 127 are moved downwardly to bolt head engaging position by means of a fork lever 146. The lever 146 includes a pair of spaced arms 147 which at their forward ends overlie the bearings 132 and 138. The lever 146 also includes a common arm 148 which projects rearwardly from the pivot 149 for the lever 146. The pivot 149 engages through a pair of upstanding ears 150 which are carried by the upper side of the plate 118.

The forked lever 146 is rocked downwardly at its forward end to bolt rotating position by means of a vertically slidable rod or plunger 151 which is slidable through an opening 152 in the rear portion of plate 118. The lower end of the rod or plunger 151 is formed with a cam engaging head 153 which is adapted to engage an upstanding cam 154 carried by the upper side of plunger 94. The cam 154 is substantially V-shaped in transverse section and is so positioned with respect to the head 98 of plunger 94 that rod 151 will be raised to operative position after head 98 has moved forwardly between the arms 90 and 91.

At this initial spreading of arms 90 and 91, jaws 83 and 84 have only partially gripped bolt B, the threads of jaws 83 and 84 partly engaging the threads of bolt B. When rod 151 is moved upwardly the forward ends of the arms 147 of fork lever 146 are swung downwardly, thereby lowering wheels 126 and 127 to bolt head engaging position, and at this time belts 144 and 145 will be tightened by raising of the outer ends of levers 134 and 140 so that shafts 128 and 130 will be rotated with shafts 32 and 34, respectively.

After the peak of cam 154 passes forwardly beneath the cam head 153, the rod 151 will drop downwardly and belts 144 and 145 will pull levers 134 and 140 respectively downwardly at their outer ends and wheels 126 and 127 will be raised to their normal disengaged position with respect to the head 125 of the bolt.

In the use and operation of this drilling machine, the bolt B is inserted at its upper end in slot or opening 124, the head 125 engaging the upper side of the plate 118 so that the bolt B will depend from plate 118 with the lower threaded end thereof engaging in a forwardly opening slot 155 which is formed in the forward side of block 77. In their initial inoperative positions motors 22 and 23 will be disposed with the drills 36 and 37 spaced outwardly from jaws 83 and 84. In Figures 1 and 2, the motors 22 and 23 are positioned at substantially their midway position.

As the cams 38 and 39 are rotated by worm gear 43 which is under constant rotation from drive shaft 46 and worm 45, the plungers 56 and 60 riding over the cam lobes 52 will be forced outwardly, and outward movement of rods or plungers 56 and 60 will rock the upper ends of levers 64 and 70 inwardly. Inward rocking of the upper ends of levers 64 and 70 will force the motors 22 and 23 inwardly against the tension of springs 76 and 78. At a time prior to the engagement of drills 36 and 37 with the lower end of the bolt, the bolt clamp operating plunger 111 will be moved outwardly by cam lobes on cam 106. As plunger 94 is moved inwardly by rocking of lever 102, the bolt clamping levers 79 and 80 will be rocked toward clamping position by head 98. As plunger 94 moves inwardly cam 154 will raise rod 151 before levers 79 and 80 are in their completely clamped position so that lever 146 will be rocked downwardly at its forward end, bringing bolt rotating wheels 126 and 127 into engagement with the head 125 of the bolt.

The bolt is thereby threaded tightly into clamping jaws 83 and 84, the head 125 tightly engaging the upper side of plate 118. As plunger 94 continues to move inwardly toward bolt clamping position, cam 154 will ride forwardly beneath cam head 153 of plunger rod 151 so that this latter rod will be in a released position and at this time elastic belts 144 and 145 will swing levers 134 and 140 downwardly at their outer ends to disengage wheels 126 and 127 from the head of the bolt.

Preferably, the cams 38 and 39 are so adjusted relative to each other that drill 37 begins its inward movement ahead of drill 36 and drill 37 will pass the axial center of bolt B at about the time drill 36 contacts the periphery of the bolt B. When the plungers 56 and 60 pass over the arcuate rise portions of the cam lobes, they will be moved inwardly in a quick movement by the radial trailing ends or surfaces 53 of the cam lobes. When pressure of the motors 22 and 23 has been released by the passing over of the inner ends of the plungers 56 and 60 on the cam lobes of cams 38 and 39, springs 76 and 78 will force motors 22 and 23 outwardly, motor 23 going outwardly first and motor 22 following motor 23. At the time motors 22 and 23 are moved outwardly to their inoperative positions, spring 99 will move plunger 94 outwardly to released position and spring 85 will also open jaws 83 and 84. The now drilled bolt may be removed from the supporting plate 118 and a new bolt inserted in the opening 124. By providing the opposed clamping jaws 83 and 84 through which drills 36 and 37 engage, the hole drilled through the bolt by these drills will not have a burr or burrs at the opposite ends of the hole, the clamping jaws 83 and 84 constituting jigs for guiding the drills and for preventing the formation of burrs at one or both ends of the transverse bolt hole.

This invention is an improvement over the drilling jig construction embodied in application Serial Number 514,682, filed December 17, 1943, by Fred H. Cameron.

What I claim is:

1. A drilling machine comprising an opposed pair of drilling members, means for reciprocating said members, a pair of workpiece clamping members, a slotted support above said clamping members for dependingly supporting a workpiece with a portion of the latter between said clamping members, and means operated in timed relation with respect to the reciprocation of said drilling members for clamping a workpiece between said support and said clamping members.

2. A drilling machine comprising an opposed pair of drilling members, means for reciprocating said members, a pair of workpiece clamping members, means operated in timed relation with respect to the reciprocation of said drilling members for clamping a workpiece, a supporting member disposed above said clamping members for dependingly supporting a workpiece in a position with a portion of the latter disposed between said clamping members, and means operated in timed relation with respect to said clamping means and active after said clamping means has initially moved to clamping position and prior to the time the latter are in full clamping position for rotatably adjusting the workpiece relative to said clamping means and said supporting member.

3. A drilling machine as set forth in claim 2 wherein said third mentioned means includes a pair of rockable pressure members adapted when in operative position to engage the workpiece, and means normally maintaining said pressure members in inoperative position.

4. A drilling machine as set forth in claim 2 wherein said third mentioned means includes a pair of rock members, rotatable workpiece adjusting members carried by said rock members, and means connecting said adjusting members with said drilling members for operation thereby.

5. A drilling machine as set forth in claim 2 wherein said third mentioned means includes a pair of rock members, rotatable workpiece adjusting members carried by said rock members, means connecting said adjusting members with said drilling members for operation thereby, a fork lever, a pivotal support for said fork lever, said fork lever disposed in a position whereby an arm thereof will contact a rock member, and means for rocking said fork lever to move said rock members into operative position in timed relation with respect to the movement of said clamping means to clamping position.

6. A drilling machine comprising an opposed pair of reciprocal drilling members, rotary cam means, a pair of plungers engageable at one end thereof with said cam means, a rock lever for each plunger engageable with the opposite end of the latter, means adjustable relative to said rock lever and engaging a drilling member whereby the endwise position of one drilling member may be adjusted relative to the other drilling member, a pair of pivoted workpiece clamping members, timed means for moving said clamping members to clamping position, means above said clamping members for dependingly supporting a workpiece in a position for engagement by said clamping members, means carried by said supporting means engageable with the workpiece whereby to tighten the workpiece between said supporting means and said clamping members.

WILBUR B. BURKE.